Jan. 16, 1968 A. K. JENSEN 3,364,391

REGENERATIVE DRIVE CIRCUIT WITH CURRENT LIMITING

Filed July 3, 1964

INVENTOR
ALAN K. JENSEN
BY Charles L. Johnson, Jr.
ATTORNEY

United States Patent Office 3,364,391
Patented Jan. 16, 1968

3,364,391
REGENERATIVE DRIVE CIRCUIT WITH CURRENT LIMITING

Alan K. Jensen, Livingston, N.J., assignor to Litton Business Systems, Inc., a corporation of Delaware
Filed July 3, 1964, Ser. No. 380,164
5 Claims. (Cl. 317—33)

This invention relates to load control systems and more especially it relates to systems wherein a load current is controlled by an input triggering signal or pulse.

Heretofore when load current has been controlled by a relatively transient input voltage or pulse, it has been customary to use a thyratron tube between the input and output. Such thyratron tube control has a number of disadvantages which are inherent in the fact that the thyratron tube itself is a somewhat critical device dependent upon the pressure, temperature, and other characteristics of the gas or vapor filling within the tube. Furthermore, the "on" and "off" switching characteristics of a thyratron tube may not be fast enough to control certain kinds of load devices such as are especially required in high speed computer systems and the like.

Accordingly, one of the principal objects of the present invention is to provide a power control arrangement wherein the triggering of a load to two different conditions such as the "on" and "off" conditions, is achieved by transducers of the solid state kind, such, for example, as transistors and the like.

Another object is to provide a novel high speed circuit breaker of the transistor kind which can accurately control the "on" and "off" switch of a load device in response to input pulses of relatively low voltage and duration.

Another object is to provide a solid state transducer circuit arrangement for controlling a load current so that it can be automatically shut off when it reaches a pre-selected and adjustable level, or when the control device has suitably responded to the load current.

A feature of the invention relates to a load control circuit arrangement employing a plurality of solid state transducers such as transistors, so interconnected between the input control source and the output load, that the switching of the load "on" and "off" is substantially free from electrically disturbing transients such as are present in systems employing load devices of the mechanical shiftable switch or relay kind.

Another feature relates to a thyratron-like load control system employing a plurality of solid state transducers such as transistors, as a switching junction between a relatively low level input control voltage source and a relatively high current load device; and wherein the transducers are interconnected between the input and output to provide a regenerative or current sustaining action so that the system is capable of two stable states corresponding respectively to two different levels of input control voltage, and wherein the load current is maintained by the transducers after the input voltage has returned from its high level to its low level.

Another feature relates to a thyratron-like load control system employing a combination of transistors and associated circuits, especially adapted to the control of load devices of relatively high self-inductance, such as solenoids and the like, and also for driving a load circuit of low impedance with loading current self-limiting.

A further feature relates to the novel organization and interconnection of parts which provide a solid state transducer arrangement for driving high speed devices while achieving a high gain, persistency of memory in the operating load current and with high load current capability.

Other features and advantages not specifically enumerated will be apparent after a consideration of the following detailed descriptions and the appended claims.

In the drawing, which shows certain preferred forms,

Figure 1:
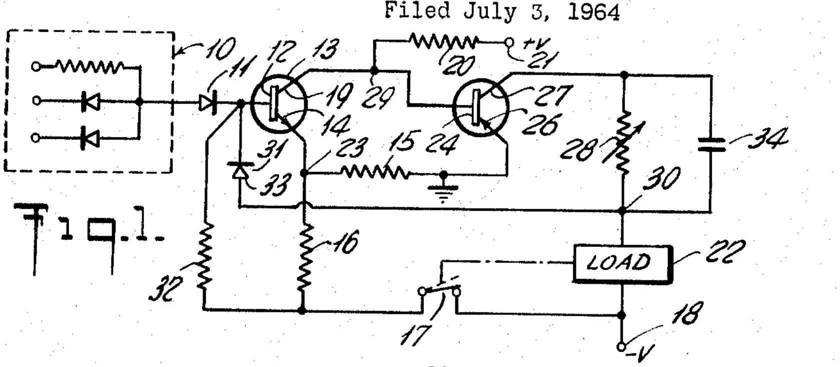
FIG. 1 is a schematic wiring diagram of the invention applied to the control of a load device such for example as a solenoid or similar electro-mechanical device.

Referring to FIG. 1 of the drawing, the block 10 represents any well known source of control signals such for example as so-called logic signals representing one of two signal conditions by respective levels of voltage. Thus one voltage of 0 volt positive may represent one control condition and 6.0 volts negative may represent a different control condition. These control voltages may be in the form of pulses and are applied through an asymmetric conducting device or diode 11 to the base electrode 12 of any well known solid state transducer 13 which may be a N-P-N transistor of the 2N585 type designation. The emitter 14 is connected to ground through one resistor section 15 of a voltage divider, the other section 16 of which is connected via the closed contact of switch 17 to terminal 18 which is connected to a suitable negative D.C. source. Merely for illustration, the potential applied to terminal 18 may be −24 volts. The collector 19 of transistor 13 is connected through a current limiting resistor 20 to a terminal 21 to which is applied a positive D.C. voltage which may be, for example, +18 volts. The resistors 15 and 16 are so proportioned with respect to the negative potential at terminal 18 that in one input control condition of source 10, (namely −6 volts) representing for example an "off" condition for the load device 22, the point 23, at the junction of resistors 15 and 16, is at a voltage approximately midway between the two levels of input control voltage from source 10, for example −3 volts with respect to the ground. The emitter 14 is thereby biased so that minimum current flows through resistor 20 and the collector 19 remains at a steady minimum potential, in other words, the transistor 13 may be considered in an "off" condition.

The collector 19 of transistor 13 is connected directly to the base 24 of a P-N-P transistor amplifier 25 whose emitter 26 is connected directly to ground and whose collector 27 is connected through an adjustable resistor 28 and thence through load device 22 to the terminal 18. Thus, so long as transistor 13 is in the "off" condition then likewise the transistor 25 is held in the "off" condition.

When the input control voltage from source 10 goes to 0 volts and exceeds the potential at point 23 it thereby changes, through the diode 11, the bias between base 12 and emitter 14 to cause transistor 13 to become highly conductive and thereby to change correspondingly the potential at point 29. This changes the bias on base 24, and transistor 25 is thereby keyed "on" and passes current through resistor 28 and through the load 22.

The potential at the point 30 resulting from this load current is applied through the rectifier or diode 31 to the base electrode 12. This causes the said base to be held at a voltage whereby both transistors are maintained in the "on" condition, thus continuing the desired flow of load current. This therefore represents a second stable state for the system. The input control voltage from source 10 may now return to its low level (−6 volts) and the system will continue to supply load current until either of two conditions occur. A resistor 32 is connected as shown to absorb leakage current from the input of transistor 13.

If the load 22 is an electro-mechanical device such as a solenoid, it may have its movable armature linked to the armature of the normally closed switch 17. Thus when the load current from transistor 25, which operates the solenoid switch 17, causes the switch 17 to open, breaking the circuit to the emitter 14 of transistor 13 causing transistor 25 to return to the "off" condition, and the solenoid to restore to normal allowing switch 17 to restore to its closed position to render the circuit ready for another input pulse or signal.

The second manner of restoring the system to the stable "off" condition arises when the load current exceeds a predetermined level which can be pre-selected by a calibrated adjustment of the variable resistor 28. Thus, if the load current exceeds such pre-selected value, there is a corresponding increased voltage drop across resistor 28. If the consequent rise in potential at point 30 exceeds the potential of point 23, this also results in a reduction of the emitter current of transistor 13 and a consequent reduction in the base current of transistor 25 to zero. Thus the circuit returns to its "off" stable state. It should be noted that when the load 22 is highly inductive the input current required from source 10 to key the circuit to the "on" condition may be very low. Because of the high inductance of the load, practically all the initial output current from the collector 27 can be used to provide additional driving current for the base 12 of transistor 13. Thus the system regenerates the output current from transistor 25 into corresponding input currents at the base 12 of transistor 13. Hence, heavy inductive load current can be supplied with relatively low input current from source 10. In other words, there is a high current gain in the system which may exceed $I_n \times B_1 \times B_2$ where $I_n$ is the input current from source 10, $B_1$ is the current gain of transistor 13 and $B_2$ is the current gain of transistor 25. The final output current is limited only by the heat dissipation properties of the components and the resistor 16 should be capable of supplying an amount of current represented by $Ic_2/B_2$, where $Ic_2$ is the collector current of transistor 25.

It should also be noted that the above described self-limiting operation renders the circuit especially useful for driving current pulses into load circuits of very low impedance and the peak current amplitudes can be adjusted by resistor 28. If desired, the return of the circuit to the "off" stable state can be made faster by replacing resistor 15 with any well known voltage limiter such for example as a Zener diode. Furthermore, if the automatic shut-off in response to high load current is not desired, the anode 33 of diode 31 can be connected directly to the collector 27 instead of to the point 30.

Figure 2:
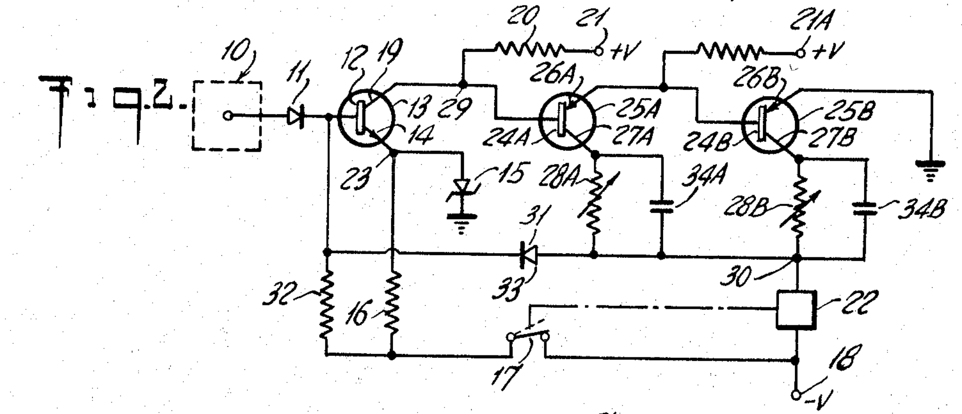
FIG. 2 is a schematic wiring diagram of a modification of FIG. 1.

The output capabilities of the system of FIG. 1 can be increased by replacing the single output transistor 25 of FIG. 1 with the well known dual transistor Darlington array as shown in FIG. 2. The parts of FIG. 2 which correspond functionally to those of FIG. 1 bear the same reference numerals. The dual transistor elements corresponding to the elements of the single transistor 25 of FIG. 1, are designated in FIG. 2 respectively by the suffixes A and B. In FIG. 2 two distinct load resistors 28A and 28B are used to share the load current as well as sharing in the self-limiting action accomplished by the single resistor 28 of FIG. 1. The resistors 28A and 28B should be chosen of a large value compared to the saturation resistance and input impedances of the respective transistors 25A, 25B. In other respects, the functioning of FIG. 2 is the same as that of FIG. 1.

In two circuits corresponding respectively to FIGS. 1 and 2, that were found to produce the desired results, the values for the various components were as follows:

FIG. 1

33—68K
15—200 ohms
16—1K
20—10K
28—10 ohms
13—2N585 transistor
25—2N586 transistor
11—1N636 diode
31—1N636 diode
21—+6 volts
Input—1 ma.
Output—400 ma.

FIG. 2

33—68K
15— 4 volt zener diode
16—1K
20, 20A—10K, 3K
28A, 28B—10 ohms, 10 ohms
13—2N585 transistor
25A, 25B—2N586 transistor (Darlington)
11—1N636 diode
31—1N636 diode
21—+6 volts
Input—1 ma.
Output—1 amp.

Figure 3:
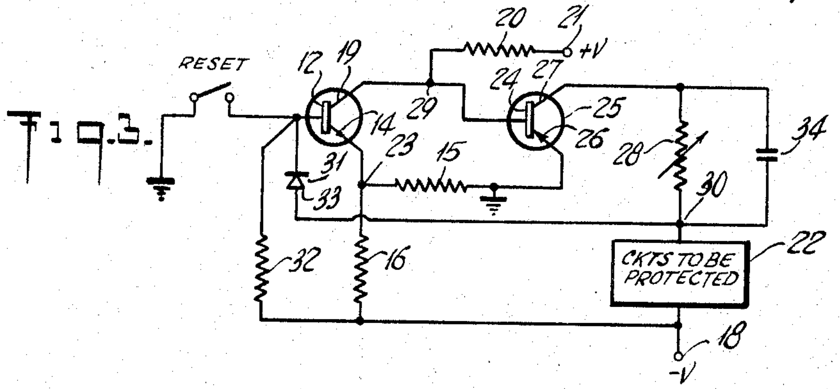
FIG. 3 is a schematic wiring diagram showing the invention embodied in a high speed automatic disconnect for a load circuit for protecting it from excessive load current.

The invention is also useful where a high speed disconnect or circuit breaking action is required for the protection of other equipment. Thus as shown in FIG. 3, the block 22 may represent any circuit configuration or system to be protected against excessive current and to be controlled by the transistor 25. In this embodiment the circuit is placed in the on condition by the momentary operation of the reset switch. The momentary operation of this switch corresponds functionally therefore to the receipt of an on signal from the device 10 of the preceding figures. The circuit of FIG. 3 is maintained in the on condition until the load current in the circuits to be controlled, exceeds a predetermined level whereupon the circuit reverts to its off condition as hereinabove described. The circuit breaker circuit can then be reset by another momentary operation of the reset switch.

In all the foregoing embodiments if desired, the resistor 28 can be shunted by a capacitor 34 (FIGS. 1, 2 and 4) or capacitors 34A, 35B (FIG. 2). This shunt capacitor allows temporary load currents to exceed the desired threshold level, this allowable overload current and its duration being determined by the size of the shunt capacitor. Thus in the circuit breaker arrangement of FIG. 3 this capacitor imparts to the circuit the effect of a delayed or slow-blow fuse. Furthermore it provides for the charging of stray capacitive loads. The shunt capacitor also provides automatic setting or turning on of the circuit breaker upon application of the power to the system.

Figure 4:
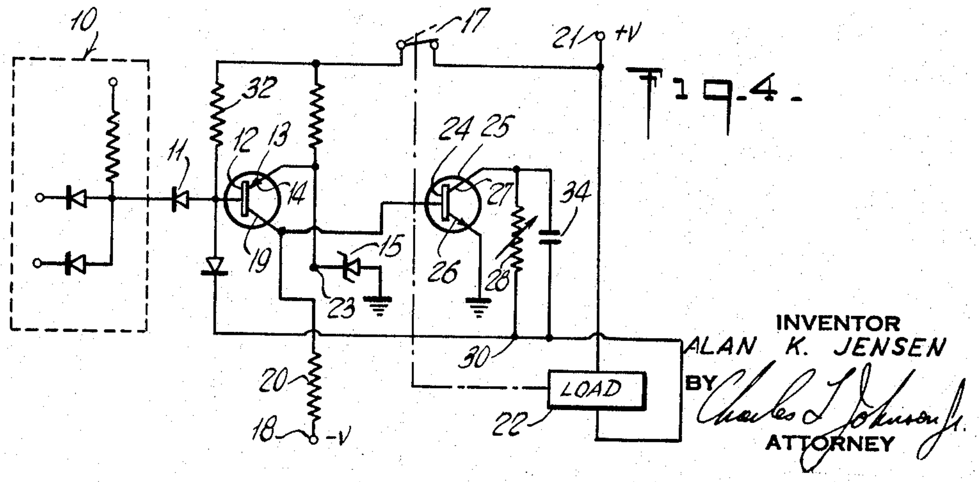
FIG. 4 shows another modification of the invention.

While certain typical values and types of circuit elements have been disclosed herein, it will be understood that the invention is not necessarily limited thereto. For example, while transistors of certain particular electrode configurations are illustrated in the drawing, it will be understood that other well known transistor configurations can be employed without departing from the purposes and scope of the invention. Thus as shown in FIG. 4 the transistors 13 and 25 instead of being respectively of of the NPN and PNP types may be respectively of the PNP and NPN types. In that case, and as shown in FIG. 4, the polarities of the various voltage sources are reversed. The elements of FIG. 4 are otherwise identical with those of FIG. 1 and function in the same manner as hereinabove described.

What is claimed is:

1. Load control apparatus comprising input and output terminals, a plurality of transducers at least one of which is a solid-state transducer and interconnecting said input and output terminals said input terminals arranged to receive load-control voltages of discrete levels, circuit connections responsive to one of said levels for rendering said transducers effective to cause one current-load condition in the load to be controlled, other circuit connections responsive to another of said levels for keying both said transducers to another condition to cause a different current-load condition in said load, and additional circuit connections between said transducers for maintaining one of said load current conditions independently of the corresponding one of said control voltages, said additional circuit connections permitting an output voltage of the second of said plurality transducers to be fed back to the input of the first of said plurality transducers whereby said plurality of transducers are each keyed to the "off" condition when said load current is above a predetermined level, said additional circuit connections being adjustable to select the load level cut-off point.

2. Load control apparatus comprising input and output terminals, two transistors and interconnecting said input and output terminals said input terminals arranged to receive load-control voltages of discrete levels, circuit connections responsive to one of said levels for rendering said transistors effective to cause one current-load condition in the load to be controlled, other circuit connections responsive to another of said levels for keying both said transistors to another condition and thereby to cause a different current-load condition in said load, said transistors being interconnected to amplify the input current to the first transistor, voltage divider means for biasing the first transistor to a point intermediate between said discrete levels of input control voltage, an adjustable element in series with the output of the second transistor and the load to be controlled and circuit connection connecting the output of the second transistor to the input of the first transistor to feed back to the input of the first transistor a direct current voltage of a polarity to maintain both of said transistors conductive only so long as the load current does not exceed a level determined by the setting of said adjustable element and independent of the corresponding one of said control voltages.

3. Apparatus according to claim 2 in which said voltage divider includes in series a resistor and a voltage limiter of the zener diode kind.

4. Apparatus according to claim 1 in which said plurality of transducers includes an input transistor and a pair of output transistors, the output currents from said pair of transistors being connected in parallel to the load to be controlled.

5. Load control apparatus comprising a current input circuit, a current output circuit, a plurality of transistors interconnecting said input and output circuits and including circuit interconnections between said transistors whereby normally both transistors are biased against supplying current to said output circuit when the input current is at one level and for maintaining both transistors conductive when they have been triggered on by another level of input current, and direct current feed-back means between the output and input circuits to enable said output current to be maintained independent of said input current but for a duration dependent upon the level of current in the output circuit.

References Cited

UNITED STATES PATENTS

| | | | |
|---|---|---|---|
| 3,122,646 | 2/1964 | Deysher et al. | |
| 3,262,015 | 7/1966 | McNamee et al. ---- | 317—33 X |
| 3,303,387 | 2/1967 | Springer ---------- | 317—33 X |
| 3,131,344 | 4/1964 | Rosenfeld et al. ---- | 317—33 X |
| 3,259,803 | 7/1966 | Battista ------------- | 317—31 |

MILTON O. HIRSHFIELD, *Primary Examiner.*

J. D. TRAMMELL, *Assistant Examiner.*

UNITED STATES PATENT OFFICE

CERTIFICATE OF CORRECTION

Patent No. 3,364,391 January 16, 1968

Alan K. Jensen

It is certified that error appears in the above identified patent and that said Letters Patent are hereby corrected as shown below:

In the heading to the printed specification, line 5, "Delaware" should read -- New York --. Column 1, line 58, after "transducers" insert -- even --. Column 5, "nection" should read -- nections --.

Signed and sealed this 14th day of April 1970.

(SEAL)
Attest:

Edward M. Fletcher, Jr.
Attesting Officer

WILLIAM E. SCHUYLER, JR.
Commissioner of Patents